US010040422B2

(12) United States Patent
Demeritte

(10) Patent No.: US 10,040,422 B2
(45) Date of Patent: Aug. 7, 2018

(54) VEHICLE SEAT BELT ATTACHMENT APPARATUS FOR PROVIDING AN AUTOMATIC ALERT NOTIFICATION

(71) Applicant: Jennifer Demeritte, Pembroke Pines, FL (US)

(72) Inventor: Jennifer Demeritte, Pembroke Pines, FL (US)

( * ) Notice: Subject to any disclaimer, the term of this patent is extended or adjusted under 35 U.S.C. 154(b) by 2 days.

(21) Appl. No.: 15/401,287

(22) Filed: Jan. 9, 2017

(65) Prior Publication Data

US 2017/0144626 A1    May 25, 2017

Related U.S. Application Data

(63) Continuation of application No. 14/576,406, filed on Dec. 19, 2014, now Pat. No. 9,539,983.

(51) Int. Cl.
*G08B 1/00* (2006.01)
*B60R 22/48* (2006.01)
*G08B 21/24* (2006.01)

(52) U.S. Cl.
CPC ............. *B60R 22/48* (2013.01); *G08B 21/24* (2013.01); *B60R 2022/4816* (2013.01); *B60R 2022/4866* (2013.01)

(58) Field of Classification Search
CPC .................... B60R 22/48; B60R 2022/4808
USPC ......................................... 340/687
See application file for complete search history.

(56) References Cited

U.S. PATENT DOCUMENTS

| | | |
|---|---|---|
| 636,620 A | 11/1899 | Bennett |
| 3,836,955 A | 9/1974 | Cracraft et al. |
| 5,316,868 A | 5/1994 | Dougherty et al. |
| 5,454,591 A | 10/1995 | Mazur et al. |
| 5,482,314 A | 1/1996 | Corrado et al. |
| 5,581,234 A | 12/1996 | Emery et al. |
| 5,678,854 A | 10/1997 | Meister et al. |
| 5,783,871 A | 7/1998 | LeMense |
| 5,793,291 A | 8/1998 | Thornton |
| 5,949,340 A | 9/1999 | Rossi |
| 5,966,070 A | 10/1999 | Thornton |
| 5,971,432 A | 10/1999 | Gagnon et al. |
| D424,463 S | 5/2000 | Babers |
| 6,104,293 A | 8/2000 | Rossi |
| 6,104,393 A | 8/2000 | Santos-Gomez |
| 6,339,371 B1 | 1/2002 | Baggelaar et al. |
| 6,535,137 B1 | 3/2003 | Ryan |

(Continued)

*Primary Examiner* — Daryl Pope
(74) *Attorney, Agent, or Firm* — The Keys Law Firm PLLC

(57) ABSTRACT

A seat belt attachment apparatus for providing an alert notification that is secured to a conventional seat belt buckle and initiates an audible alert message each time the seat belt buckle is engaged to release the seat belt comprises a mounting member fixedly mounted to the seat belt buckle and an actuator housing is slidably disposed on the mounting member. The actuator housing is positioned such that when it is depressed, it slides into the seat belt buckle's disengaging button, thereby enabling a user to indirectly disengage a locked conventional seat belt assembly by supplying manual pressure in an actuating direction to the actuator housing. This simultaneously causes a sound module integrated with said actuator housing to emit an alert notification concerning a vehicle condition, such as a reminder to not forget a child in the vehicle.

18 Claims, 4 Drawing Sheets

(56) References Cited

U.S. PATENT DOCUMENTS

| | | |
|---|---|---|
| 6,812,844 B1 | 11/2004 | Burgess |
| 6,819,249 B1 | 11/2004 | Papp |
| 6,832,793 B2 | 12/2004 | Bingle et al. |
| 6,847,302 B2 | 1/2005 | Flanagan et al. |
| 6,853,298 B1 * | 2/2005 | Stojanowski ........... B60R 22/48 180/268 |
| 6,870,472 B2 | 3/2005 | Gift et al. |
| 6,909,365 B2 | 6/2005 | Toles |
| 6,922,147 B1 | 7/2005 | Viksnins et al. |
| 6,922,154 B2 | 7/2005 | Kraljic et al. |
| 6,922,622 B2 | 7/2005 | Dulin et al. |
| 6,924,742 B2 | 8/2005 | Mesina |
| 6,930,614 B2 | 8/2005 | Rackham et al. |
| 6,940,400 B2 | 9/2005 | Pelletier |
| 6,998,988 B1 | 2/2006 | Kalce |
| 7,009,522 B2 | 3/2006 | Flanagan et al. |
| 7,079,016 B2 | 7/2006 | Ho et al. |
| 7,081,811 B2 | 7/2006 | Johnston et al. |
| 7,097,226 B2 | 8/2006 | Bingle et al. |
| 7,106,203 B2 | 9/2006 | Edwards et al. |
| 7,106,207 B1 | 9/2006 | Marchan |
| 7,123,157 B2 | 10/2006 | Best |
| 7,218,211 B2 | 5/2007 | Ho et al. |
| 7,225,067 B2 | 5/2007 | Sleboda et al. |
| 7,230,530 B1 | 6/2007 | Almquist |
| 7,319,382 B1 | 1/2008 | Vu |
| 7,321,306 B2 | 1/2008 | Lee et al. |
| 7,339,463 B2 | 3/2008 | Donaldson |
| 7,348,880 B2 | 3/2008 | Hules et al. |
| 7,348,889 B2 | 3/2008 | Monzo et al. |
| 7,378,946 B2 | 5/2008 | Lahr et al. |
| 7,378,979 B2 | 5/2008 | Rams |
| 7,408,445 B1 | 8/2008 | Cunningham |
| 7,457,695 B1 | 11/2008 | Fields et al. |
| 7,466,221 B1 | 12/2008 | Lehr |
| 7,489,247 B2 | 2/2009 | Lee et al. |
| 7,532,964 B2 | 5/2009 | Fujita et al. |
| 7,567,181 B1 | 7/2009 | Davison |
| 7,592,905 B2 | 9/2009 | Barton et al. |
| 7,701,358 B1 | 4/2010 | White et al. |
| 7,710,277 B2 | 5/2010 | Wilson |
| 7,714,737 B1 | 5/2010 | Morningstar |
| 7,733,228 B2 | 6/2010 | Lee et al. |
| 7,786,852 B2 | 8/2010 | Kautz |
| 7,796,021 B2 | 9/2010 | Saban |
| 7,830,270 B1 | 11/2010 | Philbert |
| 7,859,413 B2 | 12/2010 | Nguyen |
| 7,930,614 B2 | 4/2011 | Sato |
| 7,932,836 B2 | 4/2011 | Nguyen |
| 7,994,906 B2 | 8/2011 | Salazar |
| 8,038,213 B2 | 10/2011 | Owens |
| 8,044,782 B2 | 10/2011 | Saban |
| 8,058,983 B1 | 11/2011 | Davisson et al. |
| 8,063,788 B1 | 11/2011 | Morningstar |
| 8,106,747 B2 | 1/2012 | Nguyen |
| 8,120,499 B2 | 2/2012 | Ortiz |
| 8,125,343 B2 | 2/2012 | Denale |
| 8,154,395 B2 | 4/2012 | Taylor |
| 8,232,874 B1 | 7/2012 | Aneiros et al. |
| 8,258,932 B2 | 9/2012 | Wahlstrom |
| 2002/0161501 A1 | 10/2002 | Dulin et al. |
| 2003/0062996 A1 | 4/2003 | Flanagan et al. |
| 2003/0122662 A1 | 7/2003 | Quinonez |
| 2003/0132838 A1 | 7/2003 | Toles |
| 2003/0173195 A1 | 9/2003 | Federspiel |
| 2004/0069075 A1 | 4/2004 | Jakoby et al. |
| 2005/0030188 A1 | 2/2005 | Flanagan et al. |
| 2005/0057350 A1 | 3/2005 | Younse |
| 2005/0072249 A1 | 4/2005 | Maeda et al. |
| 2006/0273917 A1 | 12/2006 | Rams |
| 2006/0290518 A1 | 12/2006 | Bingle et al. |
| 2009/0160232 A1 | 6/2009 | Hinze et al. |

* cited by examiner

VEHICLE SEAT BELT ATTACHMENT APPARATUS FOR PROVIDING AN AUTOMATIC ALERT NOTIFICATION

CROSS REFERENCE TO RELATED APPLICATIONS

This application is a continuation of, claims the benefit of, and incorporates by reference co-pending U.S. patent application Ser. No. 14/576,406, filed Dec. 19, 2014.

BACKGROUND OF THE INVENTION

Field of the Invention

This invention relates generally to automatic notification devices for a vehicle and, more particularly, to an apparatus selectively attachable to a vehicle seat belt which is responsive the seat belt condition to provide automatic alert notification relating to a specified vehicle condition.

Description of the Prior Art

It is an unfortunate reality that each year, there are numerous deaths that result from a child (or infant, toddler, baby) being exposed to high temperatures while in a vehicle. Statistics generally show that the majority of child heatstroke deaths occur because the caregiver simply forgot the child in the vehicle when exiting. Thus, despite many states having laws in place which prohibit leaving child unattended in a vehicle, the nature of so many of these tragic occurrences renders such laws wholly ineffective in preventing them or reducing their frequency.

Attempts have been made to solve the problem of distracted or forgetful caregivers (such as parents or custodians) leaving children trapped in vehicles. One such solution involves the use of electronic devices integral with a child seat and which sense the presence of a child and emit an alarm when the child is either left in the vehicle that has been shut off or in which the temperature is rising. A limitation of such sensor based systems, however, is that they often employ components that are relatively expensive and/or complex. Because of potential costs, such sensor based systems may be difficult to employ universally. Moreover, the complexity of such systems may these result in certain components being more prone to failure and rendering the entire system non-functional. And in a system which only generates an alert after a child has been forgotten in a vehicle, it is possible that a user would not even know of any such failure because absent a specific testing mode, the system would be effectively dormant until a child is left in a vehicle. Furthermore, it is noted that a system which only generates an alert when a child is actually in left in a vehicle would not help a user build a habit to remember turn around, look in the back seat, and check for a child's presence each time the user exits the vehicle. Such habit building can be important because a child could be left in a vehicle due to the occupant(s) failure to remember that the child was with them on a that particular day; therefore if a habit of checking for a child every time one exit's their vehicle (whether or not the child is brought along) is built, such a habit may reduce the chances that a caregiver will forget a child in a vehicle when the child is actually present.

As such, the problem of distracted or forgetful caregivers leaving children trapped in vehicles where they may suffer from heatstroke and lose their life remains. Furthermore, even if the child is saved by someone who happens to walk by the vehicle and notice the forgotten child, the caregiver's life may be wrecked due to criminal prosecution or losing custody of their loved one because of their error. Thus, there remains a need for an apparatus for providing an alert notification that is attachable to a seat belt and is automatically actuated upon the release of the seat belt. It would be helpful if such an apparatus for providing an alert notification was designed to be initiated each time a user was to exit a vehicle. It would be additionally desirable for such an apparatus for providing an alert notification to generate a user configurable audible message upon being actuated prior to the user exiting the car.

The Applicant's invention described herein provides for a vehicle seat belt attachment apparatus for providing an alert notification adapted to generate an audible alert to a user concerning a vehicle condition, such as the status of a child occupant, each time the user is preparing the exit the vehicle. The primary components of Applicant's apparatus for providing an alert notification are a mounting member and an actuator housing. When in operation, the apparatus for providing an alert notification provides an automatically generated, habit promoting, audible alert notification that can prevent a user from forgetting about a child seated behind them in the vehicle. As a result, many of the limitations imposed by prior art structures are removed.

SUMMARY OF THE INVENTION

A seat belt attachment apparatus for providing an alert notification that is secured to a conventional seat belt buckle and initiates an audible alert message each time the seat belt buckle is engaged to release the seat belt. The seat belt attachment apparatus for providing an alert notification comprises a mounting member fixedly mounted to the seat belt buckle and an actuator housing is slidably disposed on the mounting member. The actuator housing is positioned such that when it is depressed, it slides into a seat belt disengaging button for releasing the seat belt that is integral with the seat belt buckle, thereby enabling a user to indirectly disengage a locked conventional seat belt assembly by supplying manual pressure in an actuating direction to the actuator housing. Such action simultaneously causes a sound module integrated with said actuator housing to play an audible alert notification concerning a vehicle condition, such as a reminder to not forget a child in the vehicle. Thus, a user is prompted with the alert prior to leaving the vehicle each time the seat belt is disengaged.

Accordingly, the seat belt attachment apparatus for providing an alert notification not only reminds the user to check for the presence of a child in the vehicle before potentially leaving behind the vehicle with the person trapped inside of it, it also will repeatedly provide a reminder each time it is engaged. Such a repeated reminder may additionally assist in building a habit of remembering to perform such a task before leaving an automobile. Indeed, it is specifically contemplated that beyond just notifications to check for a child in the vehicle, the seat belt attachment apparatus in accordance with the present invention may be employed to remind a user to turn off the headlights or other lights, activate or deactivate emergency brakes, raise or close the car windows, pay for parking, check for the presence of a pet in the vehicle, place a handicap or parking decal on rearview mirror or dashboard, lock the car doors before walking away, hide or remove an expensive item from inside the car so as to prevent its theft, pray or to meditate or to think about something specific, or any other reminder that the user may deem necessary at the time of exiting the car.

It is an object of this invention to provide an apparatus for providing an alert notification that is attachable to a seat belt and is automatically actuated upon the release of the seat belt.

It is another object of this invention to provide an apparatus for providing an alert notification designed to be initiated each time a user was to exit a vehicle.

It is yet another object of this invention to provide an apparatus for providing an alert notification that generates a user configurable audible message upon being actuated prior to the user exiting the car.

These and other objects will be apparent to one of skill in the art.

DETAILED DESCRIPTION OF THE INVENTION

Figure 1:
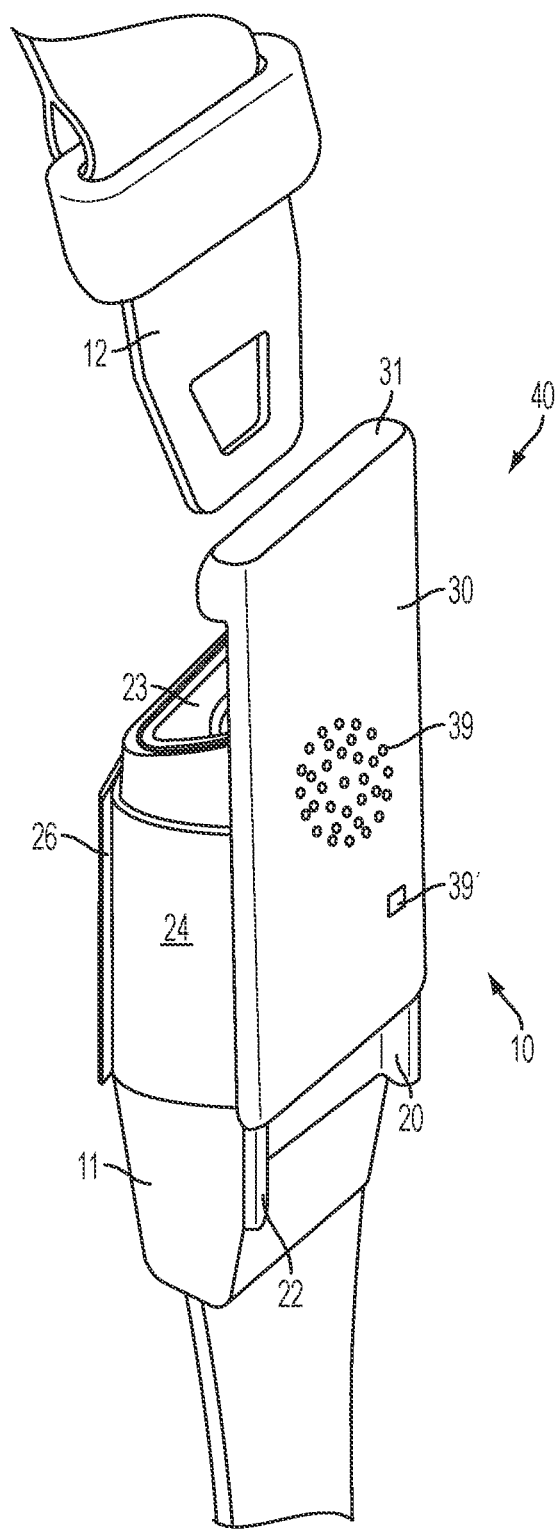
FIG. 1 is a side perspective view of a seat belt attachment apparatus for providing an alert notification built in accordance with the preferred embodiment of the present invention in place on a conventional seat belt buckle.
Figure 3A:
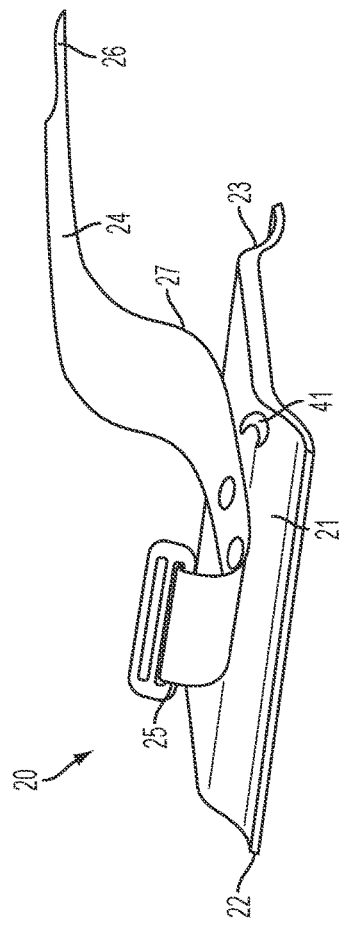
FIG. 3A is a side perspective view of a mounting member of a seat belt attachment apparatus for providing an alert notification built in accordance with the preferred embodiment of the present invention.
Figure 3B:
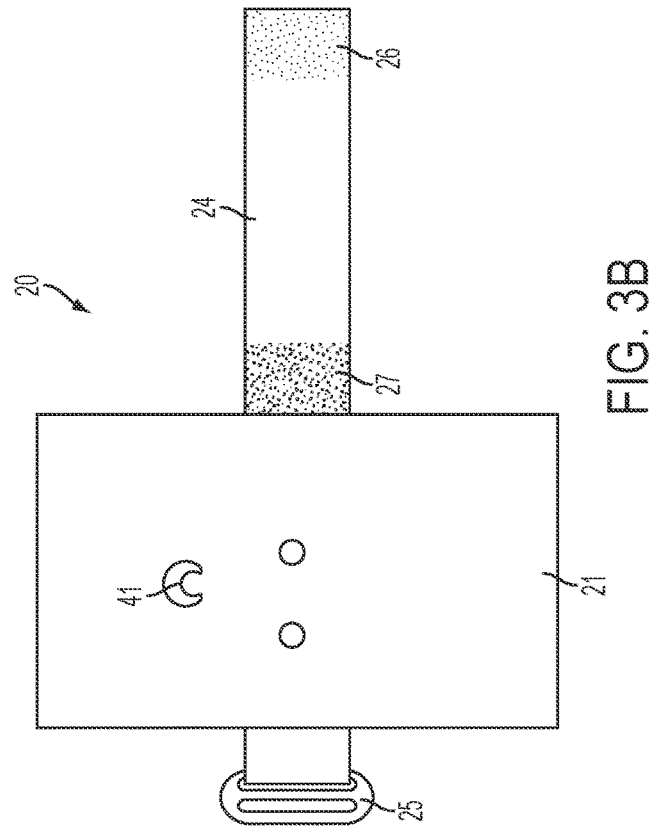
FIG. 3B is a front elevational view of a mounting member of a seat belt attachment apparatus for providing an alert notification built in accordance with the preferred embodiment of the present invention.
Figure 2:
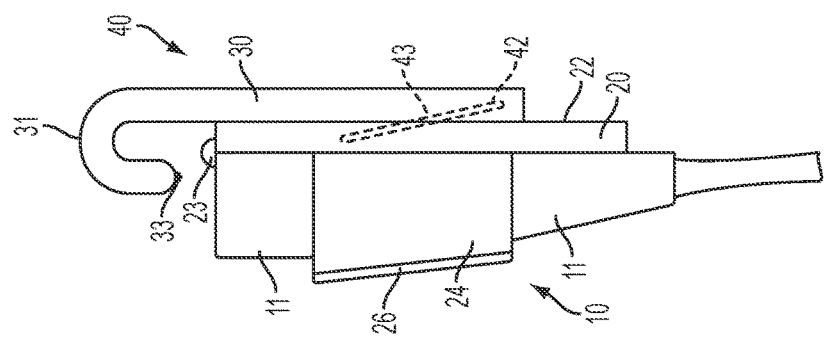
FIG. 2 is a side elevational view of a seat belt attachment apparatus for providing an alert notification built in accordance with the preferred embodiment of the present invention in place on a conventional seat belt buckle.

Referring now to the drawings and in particular FIGS. 1 and 2, a seat belt attachment apparatus 10 for providing an alert notification is shown having a mounting member 20 with an accompanying actuator housing 30 in place on a conventional seat belt buckle 11. In accordance with the preferred embodiment of the present invention, the mounting member 20 is fixedly mounted to the seat belt buckle 11 and the actuator housing 30 is slidably disposed on the mounting member 20, positioned such that the actuator housing 30 can be depressed into a seat belt disengaging button integral with the seat belt buckle 11, thereby enabling a user to indirectly disengage a locked conventional seat belt assembly by supplying manual pressure in an actuating direction 40 to the actuator housing 30 to cause it to slide down the mounting member 20 into the seat belt buckle 11.

Referring now to FIGS. 1, 2, 3A and 3B, the mounting member 20 defines a substantially planar body 21 having opposing side edge rails 22 that provide a track on which the actuator housing 30 can slide, a top stopping edge 23 that assists in holding the mounting member 20 in place on a conventional seat belt buckle 11, and an integrated member hook 41 that is employed as part of a biasing mechanism for the actuator housing 30. The edge rails 22 are mirror image structural features that define the contoured lateral sides of the substantially planar body 21, while the top stopping edge 23 defines a lip structure that extends orthogonally from one longitudinal end of the substantially planar body 21. The integrated member hook 41 is formed from an aperture in the substantially planar body 21 that is shaped to create an attachment structure and which forms part of a housing biasing system.

Attached to the substantially planar body 21 is an attachment strap assembly which includes an elongated strap member 24 and a strap buckle 25. The strap member 24 is permanently attached to the substantially planar body 20 with its opposing ends extending from opposing sides of the substantially planar body 20. One end of the strap member 24 is connected to the strap buckle 25 and the other end of the strap member 24 includes a fastener system, defined in the preferred embodiment as a fabric hook surface 26 and a fabric loop surface 27 that form corresponding fastening sections of a fabric hook and loop fastener. It is contemplated, however, that in other embodiments, alternate known fastening systems may be employed, including alternate mechanical fasteners or adhesive fasteners.

In this regard, the planar body 21 of the mounting member 20 is fixedly mounted to a conventional seat belt buckle 11 by placing its substantially planar body 21 against the seat belt buckle 11 with the top stopping edge 23 resting against the top surface of the seat belt buckle 11. The strap member 24 is then wrapped around the seat belt buckle 11, through the strap buckle 25 and fastened tightly around the seat belt buckle by engaging its fastener system. In the preferred embodiment, engaging the fastener system entails attaching the fabric hook surface 26 to the fabric loop surface 27.

Figure 4:
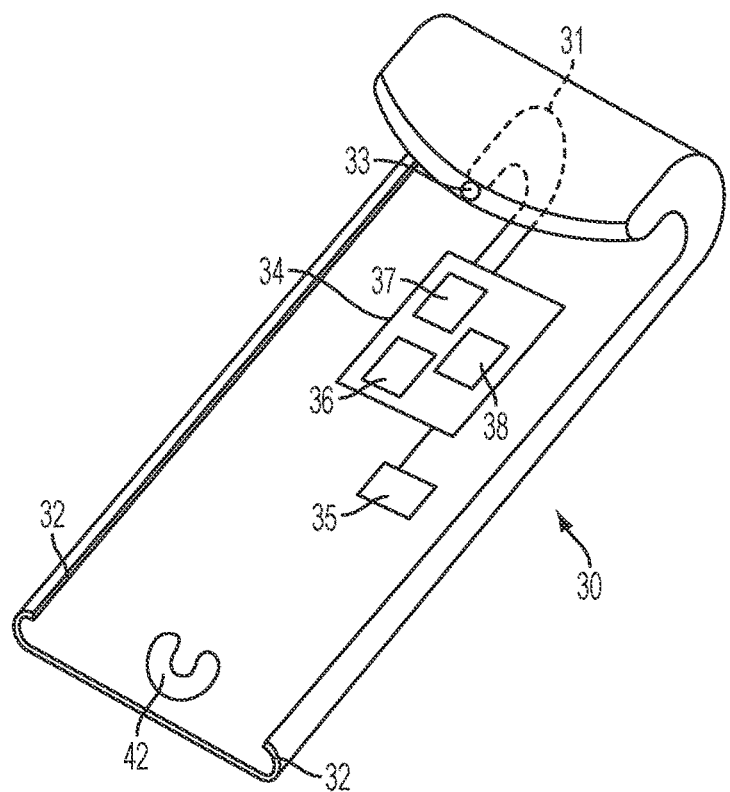
FIG. 4 is a side perspective view of an actuator housing of a seat belt attachment apparatus for providing an alert notification built in accordance with the preferred embodiment of the present invention.

Referring now to FIGS. 1, 2, and 4, the actuator housing 30 in the preferred embodiment includes a substantially planar housing body section and a hook shaped end section 31 that defines one longitudinal end. The lateral sides of the housing body section define structural curvatures that define rail grooves 32 that are sized and shaped to slidably engage the edge rails 22 of the mounting member 20, thereby allowing the actuator housing to attach to the mounting member 20 and slide up and down longitudinally along the mounting member 20. Near the end opposite of the hook shaped end section 31 is an integrated housing hook 42 formed from an aperture in the planar housing body section that is shaped to create an attachment structure and which forms part of a housing biasing system.

In the preferred embodiment, the housing body section of the actuator housing 30 includes the operative electrical components of the seat belt attachment apparatus 10 and the hook shaped end section 31 includes an actuator head 33 that is electrically connected to the operative electrical components and initiates the operating of the electrical components when engaged.

To enable the contemplated audible notification of the seat belt attachment apparatus 10, the housing body section includes operative electrical components that include a sound module 34 and a power source 35 which supplies electricity to the sound module 34. The sound module 34 defines a conventional electronic audio playback system, including a electronic voice recorder and player 36, a speaker 37, and a microphone 38. It is contemplated that the electronic audio playback system in accordance with the present invention will include non-volatile memory for storing audio files, a playback switch operative to initiate the playback of a recorded or otherwise stored audio messages over the speaker 37, and a recording switch to initiate the recording and storage of audio messages through the microphone 38. To improve the ability of sound waves generated by the electrical components to pass through the actuator housing 30, a plurality of speaker holes 39 are included housing body section in the general vicinity of where the speaker 37 is located thereon.

In the preferred embodiment, the actuator head 33 defines a biased push button switch that is connected to the playback switch and configured to control the playback of audio messages over the speaker 37. Accordingly, when manual pressure is supplied to the actuator head 33 to cause it to be depressed, it causes the electronic audio playback system to play a designated recorded or otherwise stored audio messages. As it is biased in the manner of conventional push button switches, it returns to its un-pushed state once the manual pressure is removed.

Referring now to FIGS. 1-4, when the seat belt attachment apparatus 10 for providing an alert notification is assembled, the actuator housing 30 is slidably disposed on the mounting member 20 through its rail grooves 32 engaging the edge rails 22 of the mounting member 20. In this slidable orientation, the actuator housing 30 is biased to be in an elevated position relative to the mounting member 20, as exemplified in FIGS. 1 and 2, through the housing biasing system. In the preferred embodiment, the housing biasing system defines an elastic member 43, defined as a rubber band, that is connected to the member hook 41 at one end and to the housing hook 42 at the other end. In one embodiment, the elastic member defines a spring.

The elastic member 43 is sized and adapted from a tension standpoint to sufficiently resist gravity and hold the actuator housing 30 in the elevation position exemplified in FIGS. 1 and 2 in the absence of manual pressure in the actuating direction 40. When manual pressure in the actuating direction 40 is supplied, the elastic member 43 is stretched to allow the actuator housing 30 to slide in the actuating direction 40. When such manual pressure is removed, the elastic member 43 causes the actuator housing 30 to return to the elevation position exemplified in FIGS. 1 and 2.

Accordingly, when the assembled seat belt attachment apparatus 10 for providing an alert notification is in place on a conventional seat belt buckle 11 with the mounting member 20 fixedly attached to the seat belt buckle 11 and the hook shaped end section 31 oriented over the seat belt disengaging button, the application of manual pressure in the actuating direction 40 to the actuator housing 30 (as opposed to directly on the seat belt disengaging button), following the same general motion the user would follow to push down on the seat belt disengaging button, causes the hook shaped end section 31 to press against the seat belt disengaging button. It is contemplated that this action results in not only the actuation of the seat belt disengaging button, but also the depression of the actuator head 33. Thus, through a single user action, the seat belt attachment apparatus 10 for providing an alert notification allows a user to disengage their seat belt and initiate the playback of a desired audio message to serve as an audible alert notification. In this regard, the seat belt attachment apparatus 10 for providing an alert notification provides a means for attaching to a conventional seat belt buckle 11 through the mounting member 20 and an actuating means that simultaneously disengages a seat beat and initiates an audible alert notification through the actuator housing 30.

It is understood that the mounting member's 20 fixed attachment to the seat belt buckle 11 is facilitated through both the top stopping edge 23 and the strap assembly, with the top stopping edge 23 supplementing the strap assembly to ensure that the mounting member 20 remains in place even when subjected to pressure in the actuating direction 40 through its connection to the actuator housing 30. In this regard, the top stopping edge 23 is located on the same side of the seat belt buckle 11 as the actuator housing 30 against the edge which is closest to the seat belt disengaging button and further away from the slot that receives locking member 12. In alternate embodiments, the top stopping edge 23 may be additionally supplemented with a top rim that contacts the top surface of two, three, or all four sides of the seat belt buckle and/or a lip structure that engages the seat belt buckle on one or more side surfaces.

It is contemplated that on some embodiments, the desired audio message would feature a spoken reminder advising the user not to forget the baby in the vehicle. It is understood, however, that the desired audio message may be configured prior to distribution or by the end user to provide an audible notification that may be helpful or desirable for a user exiting their vehicle.

It is further contemplated that the playback of the audible alert notification may include a single iteration of a word, phrase or sound, or multiple repetitions of a word, phrase or sound. Such a playback option may be user configurable through adjustments to the sound module 34. In any case, it is contemplated that whenever the actuator head 33 is depressed, the entire audible alert notification will be played (whether it includes one or multiple loops).

It is appreciated that the actuator housing 30 may be slid off the mounting member 20 when desired by a user by moving it in a direction opposite the actuation direction 40, for better access to internal components, replacing batteries, or recording a new message. Under such circumstances, the housing biasing system can be disengaged from and re-engaged to the mounting member 20 and/or actuator housing 30, respectively, for replacement purposes and/or for ease of handling of either mounting member 20 and/or actuator housing 30 when these two are separated from one another.

In one embodiment, the power source 35 defines a disposable battery. In another embodiment, the power source defines a rechargeable battery and the actuator housing 30 includes a charging port 39'. In another embodiment, a discrete battery charger (not shown) is mountable to the actuator housing or a rechargeable battery component (not shown) is mountable to the actuator housing. It is contemplated that such a rechargeable battery component may additionally include a sound module that can be controlled by the actuator head on the actuator housing through a wired or wireless electrical connection.

In another embodiment, the sound module and/or power source are disposed on the mounting member. In such an embodiment, the actuator housing and housing biasing system can be eliminated altogether such that the actuator head can be associated directly with the actuation of the release button of the seat belt disengaging button. Furthermore, in such embodiments, the mounting member may be eliminated and/or simplified such that the sound module and all of its associated parts (except for the actuator head) would be housed by the same housing that would house the battery charger (if applicable), with said housing configured to lie separate from and be removably connected to actuator head mounted on the through a wired or wireless connection, which is mounted onto the seat belt disengaging button, and/or said sound module and/or power source would be connected to the vehicle's power supply outlet.

Figure 5:
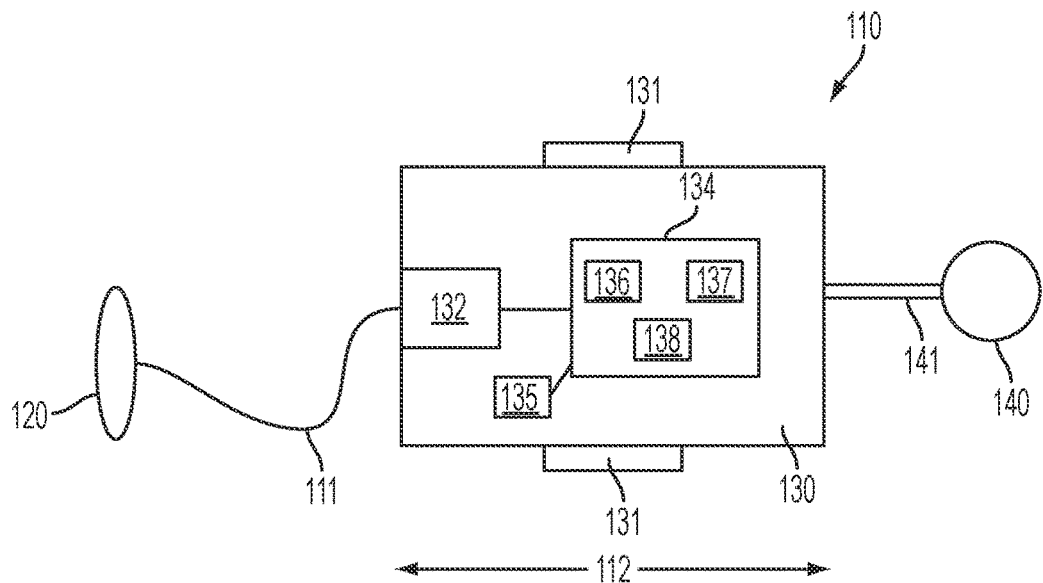
FIG. 5 is a top plan view of a seat belt attachment apparatus for providing an alert notification built in accordance with an alternate embodiment of the present invention in place on a conventional seat belt buckle.
Figure 6:
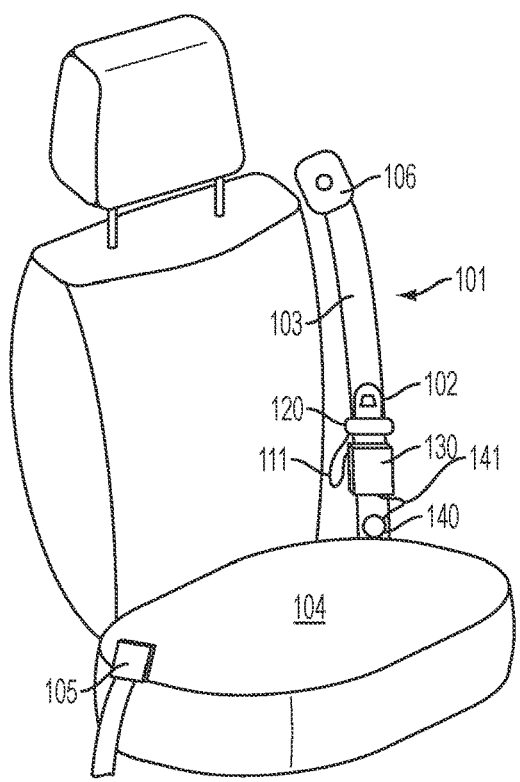
FIG. 6 is a side perspective view of a seat belt attachment apparatus for providing an alert notification built in accordance with an alternate embodiment of the present invention in place on a conventional seat belt system that is in a not in use position.
Figure 7:
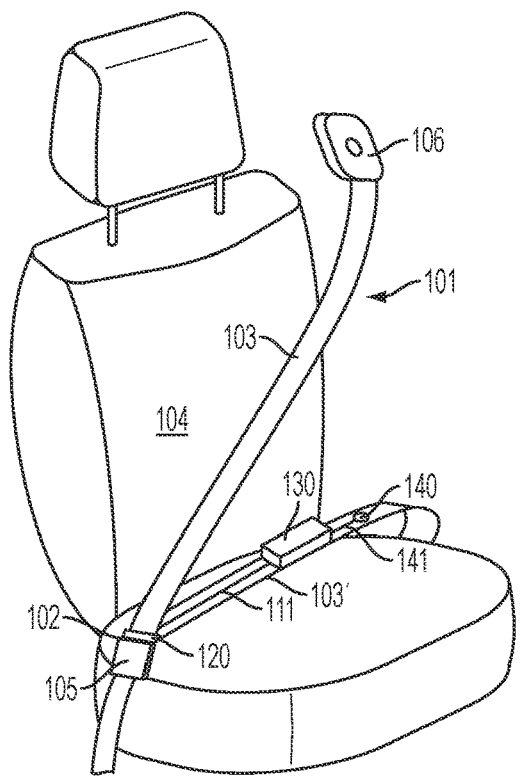
FIG. 7 is a side perspective view of a seat belt attachment apparatus for providing an alert notification built in accordance with an alternate embodiment of the present invention in place on a conventional seat belt system that is locked in an use position.

Referring now to FIGS. 5, 6, and 7, in an alternate embodiment, a seat belt attachment apparatus 110 for providing an alert notification defines a mounting member 120 that attaches to the locking member 102 of a conventional seat belt system 101, a notification housing 130 slidably disposed adjacent to the portion of the seat belt strap 103 of the conventional seat belt system 101 which extends across the waist area of a user (or, waist strap 103'), and an anchor member 140 fixedly attached to the waist strap 103'. The notification housing 130 is disposed between the mounting member 120 and the anchor member 140, connected to the mounting member 120 through a pull string cord 111 and the anchor member 140 through an elastic anchor cord 141.

Structurally, in this alternate embodiment the notification housing 130 includes opposing strap clips 131 that allow it to slidably attach to the seat belt strap 103 and a biased string reel 132 from which the pull string cord 111 is deployed. From an electronics standpoint, its operative electrical components include a sound module 134 and a power source 135 which supplies electricity to the sound module 134. The sound module 134 defines a conventional electronic audio playback system, including a electronic voice recorder and player 136, a speaker 137, and a microphone 138. As with the preferred embodiment, the electronic audio playback system in accordance with the alternate embodiment will include non-volatile memory for storing audio files, a playback switch operative to initiate the playback of a recorded or otherwise stored audio messages over the speaker 137, and a recording switch to initiate the recording and storage of audio messages through the microphone 138. In this embodiment, however, the pull string cord 111 and reel 132 operate a pull string switch operative to actuate the playback switch, and thereby enabling the operation of the pull string cord 111 to control the playback of audio messages over the speaker 137.

With respect to the anchor cord 141, it is appreciated that it includes sufficient resistance that it will only begin to stretch substantially in the event the pull cord 111 is fully extended from its reel 132 with separating force 112 still being placed on the anchor member 140 and mounting member 120.

In accordance with typical operation of conventional seat belts, it is contemplated that the when the seat belt locking member 102 is moved across the vehicle seat 104 (which would typically entail moving across the torso of a person sitting in the seat) to its corresponding seat belt buckle 105, the length of the waist strap 103' will increase as the seat belt strap 103 is unspooled or otherwise availed from a reel 106 and is passed through the locking member 102. Accordingly, when the seat belt attachment apparatus 110 is in place on such a seat belt system 101, when the seat belt strap 103 is in a dormant, not in use position, the pull string cord 111 remains in an inactive, retracted position relative to the notification housing 130. As the seat belt strap 103 is extended across the seat 104, causing the waist strap 103' to increase in length as it is fed additional strap 103 through the locking member 102, separating force 112 is generated on the seat belt attachment apparatus 110. The separating force 112 causes the anchored notification housing 130 to move away from the pull string cord 111 that is fixed to the locking member 102. This action causes the pull string cord 111 to extend, first by eliminating any slack between it and the notification housing 130 and then by unspooling from the reel 132. The pull string cord 111 unspooling from the reel 132 primes the pull string switch.

Subsequently, once the pull string switch has been primed, whenever the waist strap 103' retracts sufficiently that the pull string cord 111 is completely back on the reel 132, the pull string switch actuates the playback switch to cause the playback of the desired alert notification. It is contemplated that the waist strap 103' beginning to unspool will generally only occur when the seat belt strap 103 is sufficiently extended across the seat 104 that it would be likely to be in use by a person seated on the seat 104, and the pull string cord 111 will generally only occur when the seat belt strap 103 has been removed and is returning to its not in use position.

It is further contemplated that this embodiment has the additional advantage of being capable of automatically recharging its own batteries by alternatively comprising a generator that converts the mechanical energy stored in a spring or elastic component found within the sound module and compressed or stretched by the pulling of the string.

In one embodiment, the actuator head may be coupled with a wireless transmitter which allows an alert signal to be sent wirelessly each time the actuator head is engaged. In this regard, a remote device, such as a mobile phone can also receive an alert signal remotely each time the audible message is played. It is contemplated that a mobile phone may be configured to receive an alert signal remotely through a downloaded software application and/or by being paired with the wireless transmitter of the seat belt attachment apparatus over a personal area network.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A seat belt attachment apparatus for providing an alert notification, comprising:
   a mounting member configured to fixedly attach to a conventional seat belt buckle; and
   an actuator housing integrated with said mounting member and configured to move relative to the mounting member when subjected to manual pressure in an actuating direction from a first position to a second position so as to cause a seat belt disengaging button integral with the seat belt buckle to be actuated and an alert notification to be initiated.

2. The seat belt attachment apparatus for providing an alert notification of claim 1, wherein the actuator housing is configured to cause the seat belt disengaging button integral with the seat belt buckle to be actuated and the alert notification to be initiated simultaneously through a single manual action.

3. The seat belt attachment apparatus for providing an alert notification of claim 2, wherein the actuator housing includes a sound module and power source and the alert notification is an audible message.

4. The seat belt attachment apparatus for providing an alert notification of claim 3, wherein the actuator housing includes an actuator head positioned to contact the seat belt disengaging button when the actuator housing is subjected to manual pressure in the actuating direction, thereby causing it to be pressed against, said actuator head defining a switch that initiates the sound module to emit the alert notification with electricity supplied by the power source when it is actuated.

5. The seat belt attachment apparatus for providing an alert notification of claim 2, wherein said actuator housing is positionally biased such that it maintains the first position relative to the mounting member in the absence of manual pressure, is movable to the second position when subjected to manual pressure, and returns to the first position relative to the mounting member once the manual pressure is removed.

6. A seat belt attachment apparatus for providing an alert notification, comprising:
   a mounting member configured to fixedly attach to a conventional seat belt buckle;
   an actuator housing slidably disposed on said mounting member and configured to move relative to the mounting member when subjected to manual pressure in an actuating direction from a first position to a second position so as to cause a seat belt disengaging button integral with the seat belt buckle to be actuated and an alert notification to be initiated; and
   a housing biasing system connected to said mounting member and said actuator housing that positionally biases the actuator housing such that it maintains the first position relative to the mounting member in the absence of manual pressure.

7. The seat belt attachment apparatus for providing an alert notification of claim 6, wherein the mounting member defines a substantially planar member body having opposing side edge rails that provide a track on which the actuator housing can slide and an attachment strap assembly.

8. The seat belt attachment apparatus for providing an alert notification of claim 7, wherein the member body includes a top stopping edge that assists in holding the mounting member in place on a conventional seat belt buckle.

9. The seat belt attachment apparatus for providing an alert notification of claim 7, wherein the actuator housing includes a substantially planar housing body section and a hook shaped end section that defines one longitudinal end, said housing body section having lateral sides that define rail grooves configured to slidably engage the edge rails.

10. The seat belt attachment apparatus for providing an alert notification of claim 9, wherein the hook shaped end section is oriented to contact and depress the seat belt disengaging button of a conventional seat belt buckle to which the mounting member is attached, thereby actuating it, and includes an actuator head that is depressed when the seat belt disengaging button is actuated.

11. The seat belt attachment apparatus for providing an alert notification of claim 10, wherein:
   the actuator housing includes a sound module and power source and the alert notification is an audible message; and
   the actuator head defines a switch that is communicatively connected to the sound module and causes the sound module to emit the alert notification with electricity supplied by the power source when it is depressed.

12. The seat belt attachment apparatus for providing an alert notification of claim 10, wherein the housing biasing system biases the actuator housing to remain in the first position relative to the mounting member in the absence of manual pressure while allowing the actuator housing to slide to the second position defined by the hook shaped end section contacting and depressing the seat belt disengaging button when manual pressure in an actuating direction is supplied to the actuator housing.

13. The seat belt attachment apparatus for providing an alert notification of claim 9, wherein the housing biasing system defines an elastic member that is connected to the member body at one end and to the housing body section at the other end.

14. The seat belt attachment apparatus for providing an alert notification of claim 13, wherein the elastic member is connected to the member body on a member hook integral thereto.

15. The seat belt attachment apparatus for providing an alert notification of claim 13, wherein the elastic member is connected to the housing body section on a housing hook integral thereto.

16. The seat belt attachment apparatus for providing an alert notification of claim 7, wherein the attachment strap includes a strap member that forms a structure along with the mounting member that completely encircles a conventional seat belt buckle to which the mounting member is attached.

17. A seat belt attachment apparatus for attaching to a conventional seat belt system and providing an alert notification, comprising:
   a mounting member configured to fixedly attached to a seat belt locking member; and
   a notification housing integrated with a seat belt system and connected to said mounting member, wherein said mounting member is operative to initiate an alert notification on said notification housing upon the seat belt system moving from an in use position to a not in use position.

18. The seat belt attachment apparatus for attaching to a conventional seat belt system and providing an alert notification of claim 17, additionally comprising an anchor member attached to said notification housing.

* * * * *